US009141767B2

(12) United States Patent
Fritsch et al.

(10) Patent No.: US 9,141,767 B2
(45) Date of Patent: Sep. 22, 2015

(54) SOFTWARE CONFIGURATION BASED ON ENTITLEMENT RECORDS

(75) Inventors: James R. Fritsch, Rochester, MN (US); Lars R. Iversen, Karlslunde (DK); Russell G. Turner, Byron, MN (US); Daniel J. Wingard, Kingston, NY (US)

(73) Assignee: International Business Machines Corporation, Armonk, NY (US)

( * ) Notice: Subject to any disclaimer, the term of this patent is extended or adjusted under 35 U.S.C. 154(b) by 1497 days.

(21) Appl. No.: 11/957,057

(22) Filed: Dec. 14, 2007

(65) Prior Publication Data

US 2009/0158269 A1 Jun. 18, 2009

(51) Int. Cl.
*G06F 9/445* (2006.01)
*G06F 21/10* (2013.01)

(52) U.S. Cl.
CPC .............. *G06F 21/10* (2013.01); *G06F 21/105* (2013.01)

(58) Field of Classification Search
CPC ............................... G06F 21/10; G06F 21/105
USPC .......................................................... 717/174
See application file for complete search history.

(56) References Cited

U.S. PATENT DOCUMENTS

| | | | |
|---|---|---|---|
| 7,055,149 B2 | 5/2006 | Birkholz et al. | |
| 7,139,906 B2 | 11/2006 | Arnfield et al. | |
| 7,805,375 B2 * | 9/2010 | Fox et al. | 705/59 |
| 2005/0021992 A1 * | 1/2005 | Aida et al. | 713/200 |
| 2006/0282392 A1 | 12/2006 | Ewert et al. | |
| 2007/0112684 A1 * | 5/2007 | Coley et al. | 705/59 |
| 2007/0150417 A1 * | 6/2007 | Hu | 705/59 |

OTHER PUBLICATIONS

Garrison, M., et al; Architecture Design for a Software Inventory Application; IBM Technical Disclosure Bulletin, v37, n10, 10-94, p. 103-10.

* cited by examiner

*Primary Examiner* — Anna Deng
(74) *Attorney, Agent, or Firm* — Steven M. Greenberg, Esq.; CRGO Law

(57) ABSTRACT

Embodiments of the present invention address deficiencies of the art in respect to software license management and provide a method, system and computer program product for authorizing customer managed software installation. In an embodiment of the invention, a method for authorizing customer managed software installation based on entitlement records can be provided. The method can include in response to a request to transfer a registered software product from an existing platform to a new platform, validating both an entitlement record and also a maintenance record for the registered software product and transferring the registered software product to the new platform only if both the entitlement record and the maintenance record validate.

13 Claims, 2 Drawing Sheets customer request 205
210 Upgrade or Transfer? T U
215 retrieve entitlement record
check maintenance record 220
225 valid entitlement ? N Y
230 Refuse Transfer
update entitlement record 235
create new license key 240
245 get configuration
250 retrieve entitlement record
255 check maintenance record
260 valid entitlement ? N Y
265 Refuse Upgrade
270 update entitlement record
275 forward entitlement record to configurator
280 create software upgrade

SOFTWARE CONFIGURATION BASED ON ENTITLEMENT RECORDS

BACKGROUND OF THE INVENTION

1. Field of the Invention

The present invention relates to the field of software installation and more particularly to authorizing customer managed software installation.

2. Description of the Related Art

Historically, computer programs have been distributed in disk medium—initially on tape and eventually on floppy and optical disk. Controlling the unauthorized distribution of computer software, however, has vexed the software publishing industry from the beginning. Initial efforts to combat the unlicensed use of software involved dongles and passwords. As the distribution of multi-user software has become more complex and as target platforms in target network environments constantly change, early models for software licensure management fail. Modern efforts involve centralized registration and management of end user licensing of software applications.

In furtherance of centralized registration and management of end user licensing of software applications, in today's software configuration installation environment it has been customary to use sales inventory records to establish software configuration transfer or upgrade base starting points. When a customer is first shipped their software product, inventory records are used to accurately reflect the customer number and hardware serial number for the ordered software products. Over time the customer may eventually transfer the software products to other hardware systems within the customer's enterprise.

Typically, a customer purchases a software license and receives a key to transfer the software product on a given number of hardware systems or machines. Since the customer may transfer the software product from machine to machine, it is difficult to determine what version of software is on a particular machine. Usually when a customer orders a software upgrade, there is no nexus between where the software currently resides and the validity of software license entitlement information in inventory records.

In many instances these historical records do not match the entitled product residency. This can result in a configuration starting point that does not match the customer's actual installed and entitled use of a software product, causing a nuisance to marketing teams to manually modify inventory records so they are in agreement with existing entitled software installation support on customer systems.

The problem with current methods is that when a customer purchases a single software product, any attempt to transfer the software product to another machine is prevented. Entitling a software product to a specific machine in a customer's enterprise, and restricting the software product to that specific system only fails to support a customer's ever-changing business requirements.

BRIEF SUMMARY OF THE INVENTION

Embodiments of the present invention address deficiencies of the art in respect to software license management and provide a novel and non-obvious method, system and computer program product for authorizing customer managed software installation. In an embodiment of the invention, a method for authorizing customer managed software installation based on entitlement records can be provided. The method can include in response to a request to transfer a registered software product from an existing platform to a new platform, validating both an entitlement record and also a maintenance record for the registered software product and transferring the registered software product to the new platform only if both the entitlement record and the maintenance record validate.

In another embodiment of the invention, an authorizing customer managed software installation data processing system can be provided. The system can include a data store of inventory records, maintenance records and entitlement records for different installations of an application for different customers on different computing platforms. The system further can include an e-configurator including program code enabled to provide a configuration of the computing platforms for a specified one of the customers. Finally, the system can include a base retriever coupled to the e-configurator and the data store. The base retriever can include program code enabled to determine by reference to the inventory records, the maintenance records and the entitlement records, each of a version of an installed application in an existing one of the computing platforms based upon a serial number of the installed application, and to validate the version of the installed application in comparison to a configuration provided by the e-configurator in authorizing a transfer of the installed application to a different one of the computing platforms.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for authorizing customer managed software installation and automatic software configuration based on entitlement records. In accordance with an embodiment of the invention, a software product can be installed on an initial computing system. Subsequently, if the software product is to be installed on a different computing system, the transfer of the software product can be recorded without losing entitlement support. In this regard, before permitting a transfer to a target computing platform, an entitlement record for the software product can be consulted to determine the validity of the software license for the software product for the target computing platform. To the extent that the entitlement record can be validated to reflect that the software product can be properly licensed for operation in the target computing platform, then the transfer of the installation of the software product from the existing computing platform onto the target computing platform can proceed and the entitlement records can be modified to reflect the new installation on the target computing platform to the exclusion of the old installation on the existing computing platform.

Figure 1:
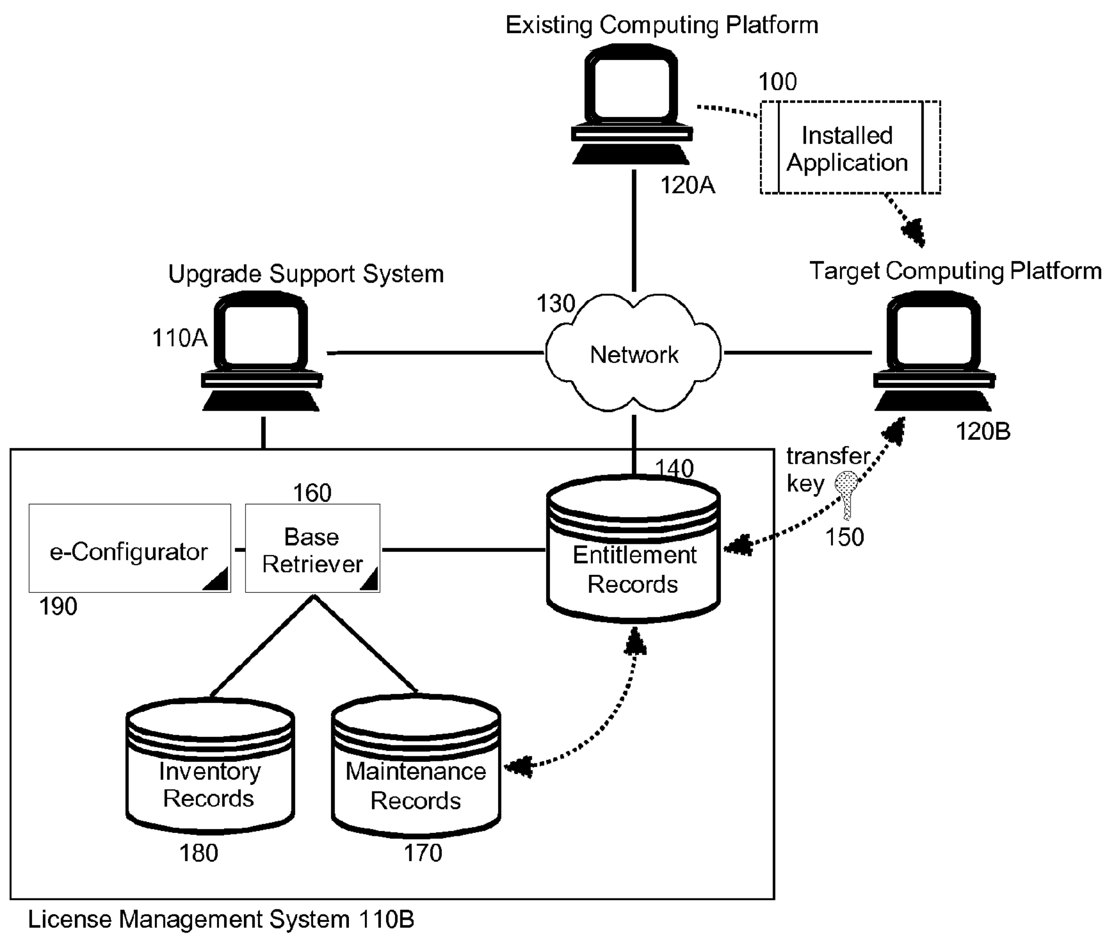
FIG. 1 is a schematic illustration of a software configuration system based on authorizing customer managed software installation.

In further illustration, FIG. 1 schematically depicts a software configuration data processing system configured to authorize an upgrade or transfer of an installed application 100 to a target computing platform 120B from an existing computing platform 120A based upon entitlement records. As shown in FIG. 1, the system can include an upgrade support system 110A such as a Web-enabled self-service application distribution system configured for communicative coupling to one or more computing platforms 120A, 120B over computer communications network 130. Specifically, the upgrade support system 110A can support the execution of a license management system 110B managing the licensure of an installed application 100.

Specifically, the license management system 110B can include an e-configurator 190 providing for the configuration of computing platforms 120A, 120B (both hardware and software) for a specified customer. A base retriever 160 further can be provided as part of the license management system 110B and can be linked to both inventory records 180 and also maintenance records 170. Yet further, the base retriever 160 can be communicatively linked to entitlement records 140 separately coupled to the upgrade support system 110A and the computing platforms 120A, 120B over the computer communications network 130. Notably, each record amongst the entitlement records 140 can relate an installed application 100 to a computing platform 120A, 120B in which the installed application 100 is entitled for installation.

The base retriever 160 can include program code enabled to determine by reference to the inventory records 180, the maintenance records 170 and the entitlement records 140, a version of the installed application 100 installed on its existing computing platform 120A based upon a serial number before an upgrade or transfer to a target computing platform 120B occurs. In particular, the inventory records 180 can include a list of hardware and software components associated with the installed application 100 as provided by the e-configurator 190 irrespective of the existing computing platform 120A. The maintenance records 170, by comparison, can record a license of the installed application 100 based upon a serial number associated with the installed application 100 irrespective of the existing computing platform 120A.

The entitlement records 140, unlike the maintenance records 170 and the inventory records 180, ties the installed application 100 to a specific one of the computing platforms 120A, 120B along with an appropriate software product release level and specific level of entitlement purchased for the specific one of the computing platforms 120A, 120B. As it will be recognized by the skilled artisan, then, while the inventory records 180 may have been valid at the time of the original sale of the installed application 100, the inventory records 180 may not reflect the true residence (e.g. the existing computing platform 120A) as the existing computing platform 120A may differ from a recorded, initial computing platform.

Likewise, machine-based records in the existing computing platform 120A may host the installed application 100 in violation of an associated licensing agreement terms and conditions. Though the maintenance records 170 can represent a group of software programs required for upgrade support, the maintenance records 170 alone are not sufficient to reflect the individual software programs installed on the customer's system due to the fact that the group of software programs may represent a suite of programs which must be individually licensed.

Accordingly, in operation, the program code of the base retriever 160 can be enabled upon receiving a request from a customer for either an upgrade or transfer of the installed application 100 to a target computing platform 120B to determine the entitlement of the customer to upgrade or transfer the installed application 100 to a target computing platform 120B. If the customer is entitled to upgrade or transfer the installed application 100 onto the target computing platform 120B by reference to the entitlement records 140, the program code of the base retriever 160 can direct the transmittal of a transfer key 150 to the target platform 120B in order both to permit the upgrade or transfer and also to record a new corresponding entry into the entitlement records 140.

The support for the customer management and transfer of a registered software product shown in FIG. 1 can be performed under the control of the customer via a Web site providing access to the license management system 110B. As a result, customers can transfer a registered software product from one platform to another and the customers can re-associate the entitlement records for the registered software product with the new platform automatically through the customer managed Web site. Further, the arrangement shown in FIG. 1 can permit the purchasing of additional entitlements for the registered software product such as additional users, processor tier upgrades, added processors, and the like using registered data on hand for the installed computing device. Finally, the arrangement shown in FIG. 1 can support the enhancement of a registered software product with a new level of entitlement while charging the customer only for the incremental entitlement purchased.

Figure 2:
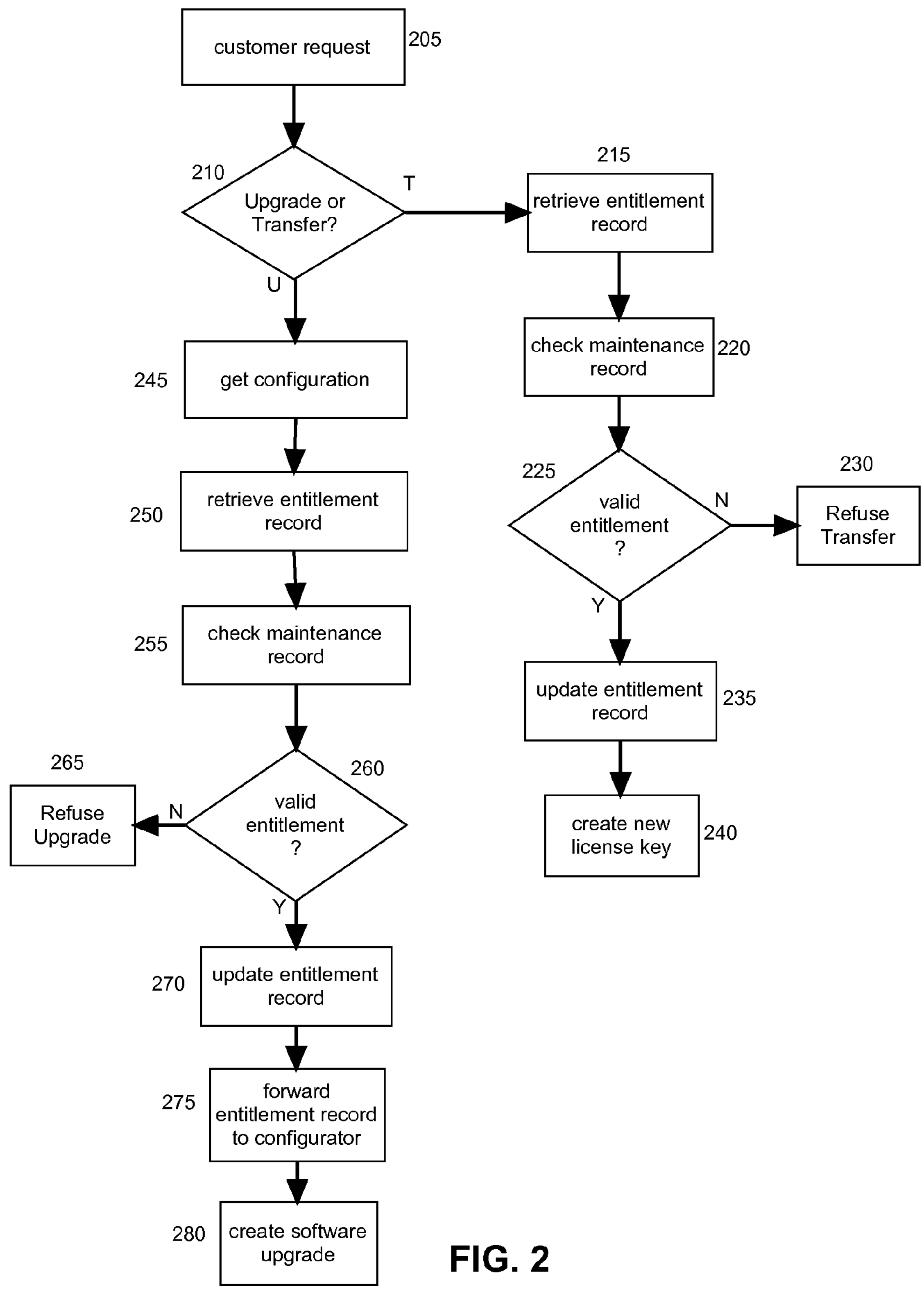
FIG. 2 is a flowchart illustrating a process for authorizing customer managed software installation.

In more general illustration of the process of the invention, FIG. 2 is a flowchart illustrating a process for authorizing customer managed software installation based on entitlement records. When a customer goes online to request an upgrade or transfer 205, in decision block 210 if it is determined that the request is a software transfer then in block 215 the entitlement record can be retrieved along with the maintenance record in block 220. If in decision block 225, the entitlement record is not valid then in block 230 the transfer can be refused and the customer can be notified with an error message. If the entitlement record is valid, then in block 235 the entitlement record can be updated with the new designated hardware system the installation will occur on. Next in block 240 a new license key can be created for the new designated hardware system. The customer can then download the new license key and transfer the software to another hardware system.

If the customer request is for a software upgrade, then in block 245 the base retriever can get the current configuration of the hardware system. Next in block 250 the entitlement record can be retrieved along with checking the maintenance record in block 255. If in decision block 260, the entitlement record is not valid then in block 265 the transfer can be refused and the customer can be notified with an error message. If the entitlement record is valid, then in block 270 the entitlement record can be updated with the new designated hardware system the installation will occur on and forwarded to the configurator in block 275. Finally, the software upgrade can be created in block 280 subsequent to which the customer can be shipped the update for the software product by the configurator.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for authorizing customer managed software installation based on entitlement records comprising:

storing a multiplicity of inventory records in a database of records, the inventory records comprising both entitlement records and maintenance records, the entitlement records each relating an instance , of an software product to a remote computing platform in which the instance of the software product is entitled to be installed, the maintenance records each relating a license to install an instance of the software product to a serial number of the instance of the software product without regard to any specific remote computing platform;

responsive to a request to transfer a registered software product from an existing remote computing platform to a new remote computing platform, identifying in the database of records from amongst the inventory records, both an entitlement record for the registered software product of the request and a maintenance record for a serial number of the registered software product, validating both the identified entitlement record and the identified maintenance record for the registered software product within the database of records by a comparison to a software configuration of the registered software product for the existing remote computing platform; and transferring the registered software product to the new remote computing platform only if both the identified entitlement record and the identified maintenance record for the registered software product in the database of records are validated.

2. The method of claim 1, wherein validating both an entitlement record and a maintenance record for the registered software product comprises:

retrieving the software configuration for the registered software product for the existing remote computing platform, and also retrieving a software entitlement record for the registered software product;

validating the software maintenance record and the software entitlement record against the software configuration; and, responsive to confirming the validity of the software entitlement and maintenance records respectively, allowing transfer of the registered software product to the new remote computing platform.

3. The method of claim 1, further comprising updating the entitlement record to represent a new residency of the registered software product in the new remote computing platform.

4. The method of claim 1, further comprising providing a Web interface to request the transfer of the registered software product to the new remote computing platform.

5. The method of claim 4, further comprising:

requesting an upgrade of entitlements through the Web interface; and, changing the entitlement record to reflect the upgrade.

6. The method of claim 5, further comprising registering an incremental upgrade license fee only for the upgrade of entitlements.

7. An authorizing customer managed software installation data processing system comprising:

a data store of inventory records comprising maintenance records and entitlement records for different installations of an application for different customers on different computing platforms, the entitlement records each relating an instance of an software product to a computing platform in which the instance of the software product is entitled to be installed, the maintenance records each relating a license to install an instance of the software product to a serial number of the instance of the software product without regard to any specific computing platform;

an e-configurator comprising a processor to execute program code in a memory of a computer system and enabled to provide a configuration of the computing platforms for a specified one of the customers;

a base retriever coupled to the e-confiaurator and the data store, enabled to identify from the inventory records, a maintenance record and an entitlement record for a version of an installed application in an existing one of the computing platforms based upon a serial number of the version of the installed application in the existing computing platform; and an validator coupled to the e-configurator and the data store to validate the version of the installed application in via a comparison of a configuration provided by the e-configurator to both the identified entitlement record and the identified maintenance record for the version of the installed application in the existing platform, and in authorizing a transfer of the version of the installed application to a different one of the computing platforms only if both of the identified entitlement record and the identified maintenance record for the version of the installed application in the existing computing platform validated.

8. A computer program product comprising a hardware computer usable storage memory device storing computer usable program code for validating software entitlement of a software product the computer program product comprising:

computer usable program code for storing a multiplicity of inventory records in a database of records, the inventory records comprising both entitlement records and maintenance records, the entitlement records each relating an instance of an software product to a remote computing platform in which the instance of the software product is entitled to be installed, the maintenance records each relating a license to install an instance of the software product to a serial number of the instance of the software product without regard to any specific remote computing platform;

computer usable program code for responding to a request to transfer a registered software product from an existing remote computing platform to a new remote computing platform, by identifying in the database of records from amongst the inventory records, both an entitlement record for the registered software product of the request and a maintenance record for a serial number of the registered software product, and validating both the identified an entitlement record and the identified maintenance record for the registered software product within the database of records by a comparison to a software configuration of the registered software product for the existing remote computing platform; and computer usable program code for transferring the registered software product to the new remote computing platform only if both the identified entitlement record and the identified maintenance record for the registered software product in the database of records are validated.

9. The computer program product of claim 8, wherein the computer usable program code for validating both an entitlement record and a maintenance record for the registered software product comprises:

computer usable program code for retrieving the software configuration for the registered software product for the existing remote computing platform, and also retrieving a software entitlement record for the registered software product;

computer usable program code for validating the software maintenance record and the software entitlement record against the software configuration; and, computer usable program code for responsive to confirming the validity of the software entitlement and maintenance records respectively, allowing transfer of the registered software product to the new remote computing platform.

10. The computer program product of claim 8, further comprising computer usable program code for updating the entitlement record to represent a new residency of the registered software product in the new remote computing platform.

11. The computer program product of claim 8, further comprising computer usable program code for providing a Web interface to request the transfer of the registered software product to the new remote computing platform.

12. The computer program product of claim 11, further comprising:

computer usable program code for requesting an upgrade of entitlements through the Web interface; and, computer usable program code for changing the entitlement record to reflect the upgrade.

13. The computer program product of claim 12, further comprising computer usable program code for registering an incremental upgrade license fee only for the upgrade of entitlements.

* * * * *